United States Patent
Nagai et al.

(10) Patent No.: US 6,749,324 B2
(45) Date of Patent: Jun. 15, 2004

(54) LAMP UNIT MOUNTING STRUCTURE

(75) Inventors: Kentaro Nagai, Haibara-gun (JP); Kenji Oishi, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 4 days.

(21) Appl. No.: 10/206,078

(22) Filed: Jul. 29, 2002

(65) Prior Publication Data

US 2003/0026104 A1 Feb. 6, 2003

(30) Foreign Application Priority Data

Aug. 1, 2001 (JP) ..................... P2001-233841

(51) Int. Cl.[7] ............................... B60Q 3/00
(52) U.S. Cl. ............... 362/490; 362/365; 362/368; 362/396; 362/549
(58) Field of Search ............... 362/490, 365, 362/368, 374, 375, 396, 390, 369, 549

(56) References Cited

U.S. PATENT DOCUMENTS

| | | | | |
|---|---|---|---|---|
| 4,473,870 A | * | 9/1984 | Soreson | 362/226 |
| 4,965,703 A | * | 10/1990 | Whalen | 362/61 |
| 6,068,387 A | * | 5/2000 | Hilton | 362/260 |
| 6,092,916 A | * | 7/2000 | Davis, Jr. et al. | 362/490 |
| 6,467,937 B2 | * | 10/2002 | Nagata et al. | 362/490 |
| 6,543,918 B1 | * | 4/2003 | Nagata | 362/488 |
| 6,595,668 B2 | * | 7/2003 | Hatagishi et al. | 362/490 |

FOREIGN PATENT DOCUMENTS

| | | |
|---|---|---|
| EP | 1 070 636 A2 | 1/2001 |
| JP | 2001-97112 | 4/2001 |

* cited by examiner

*Primary Examiner*—Jian Cariaso
*Assistant Examiner*—Jacob Y. Choi
(74) *Attorney, Agent, or Firm*—Sughrue Mion, PLLC (57) ABSTRACT

A first retainer engages with an exterior side of an interior wall member to retain a lamp unit on an interior side of the interior wall member. A second retainer engages with an exterior side of a panel body to retain the interior wall member, on which the lamp unit is mounted, on an interior side of the panel body. The second retainer includes a flexible arm having a free end portion which is flexible in a first direction parallel with the panel body and a second direction perpendicular to the panel body. The free end portion is abutted against the exterior side of the panel body when the interior wall member is mounted on the panel body. A regulator prevents the free end portion of the flexible arm from being flexed more than a predetermined amount in the second direction when the flexible arm is not flexed in the first direction.

3 Claims, 9 Drawing Sheets

PRIOR ART

LAMP UNIT MOUNTING STRUCTURE

BACKGROUND OF THE INVENTION

The present invention relates to a lamp unit mounting structure in which a lamp unit is fitted to a lamp mounting window provided in an interior wall member and electric wires connected to the lamp unit are arranged on the interior wall member at a side of a vehicle body panel thereby to form a module, and the module is assembled to the vehicle body panel so as to cover the vehicle body panel, whereby the interior wall member and the lamp unit can be simultaneously assembled to the vehicle body panel.

Heretofore, there have been proposed lamp unit mounting structures in which an interior wall member such as a roof trim or a door trim covering a vehicle body panel and a lamp unit such as a room lamp or a courtesy lamp are simultaneously fixed to a vehicle body panel in order to decrease number of steps of an assembling (fixing) work in an assembly line of vehicles.

Figure 7:
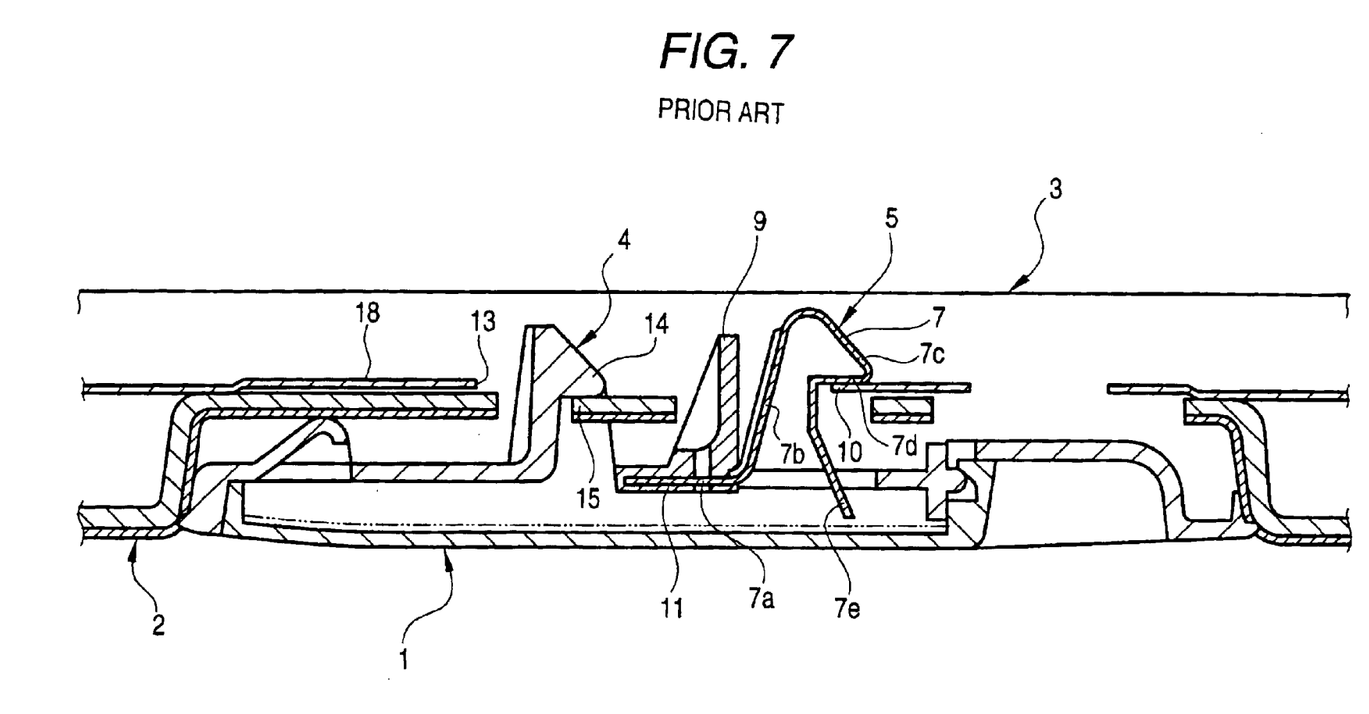
FIG. 7 is a longitudinal sectional view for explaining a related-art lamp unit mounting structure.

FIG. 7 is a longitudinal sectional view for explaining a related-art fixing structure of a room lamp which is disclosed in Japanese Patent Publication No. 2001-97112A.

In the fixing structure, a room lamp 1 and a roof trim 2 are provisionally fixed to each other by a provisional retainer 4, and at the same time, the room lamp 1 and a roof framework (reinforce) 3 of a vehicle body are plenarily fixed to each other by a plenary retainer 5, thereby allowing the room lamp 1 and the roof trim 2 to be simultaneously fixed to the roof framework 3.

The provisional retainer 4 include an engaging hook 14 provided on a side of the room lamp 1, and an engaging part 15 provided on a side of the roof trim 2.

The plenary retainer 5 provided on the room lamp 1 and the roof framework 3 include a spring 7 and a stopper 9 which are provided in the room lamp 1, and a fixing part 10 which is provided at an edge of a cut-out 13 formed in the roof framework 3.

Figure 8:
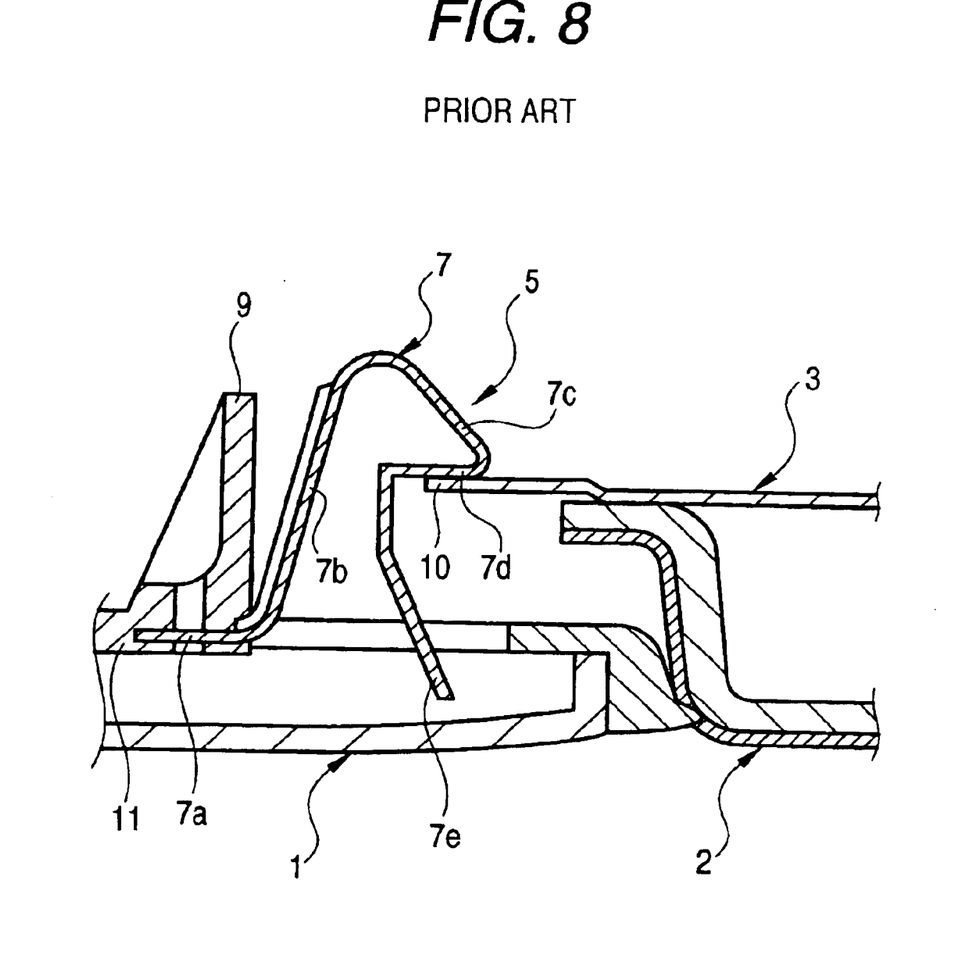
FIG. 8 is an enlarged sectional view of an essential part of a retainer shown in FIG. 7.

The spring 7 made of a metal plate includes, as also shown in FIG. 8, an embedded portion 7a horizontally embedded in a lamp housing 11 of the room lamp 1, a first elastically deformable portion 7b folded diagonally upwardly from the embedded portion 7a in an L-shape, a second elastically deformable portion 7c folded diagonally downwardly from the first elastically deformable portion 7b in an inverted U-shape, a hook portion 7d folded substantially horizontally from the second elastically deformable portion 7c, and an operating portion 7e folded downwardly from the hook portion 7d in an L-shape.

When the room lamp provided with the fixing structure is intended to be fixed in a vehicle, as a first step, the engaging hook 14 at the side of the room lamp 1 is engaged with the engaging part 15 at the side of the roof trim 2 so as to provisionally fix the room lamp 1 and the roof trim 2 by the provisional retainer 4, prior to bringing them to an assembly line of the vehicle.

Then, a roof subassembly (a roof module) composed of the room lamp 1 and the roof trim 2 which have been provisionally fixed by the provisional retainer 4 is incorporated into the assembly line of the vehicle.

In this assembly line of the vehicle, the spring 7 at the side of the room lamp 1 is brought into elastic contact with the fixing part 10 at the side of the roof framework 3 in order to plenarily fix the roof subassembly composed of the room lamp 1 and the roof trim 2 to the roof framework 3 by the plenary retainer 5. On this occasion, the engaging hook 14 will not interfere with a horizontal part 18 of the roof framework 3, owing to provision of the cut-out 13 in the roof framework 3.

In this manner, with the fixing structure of the room lamp, the room lamp 1 and the roof trim 2 can be simultaneously fixed to the roof framework 3 in the assembly line of the vehicle, and as the results, the number of steps of the assembly work in the assembly line of the vehicle can be decreased.

Figure 9A:
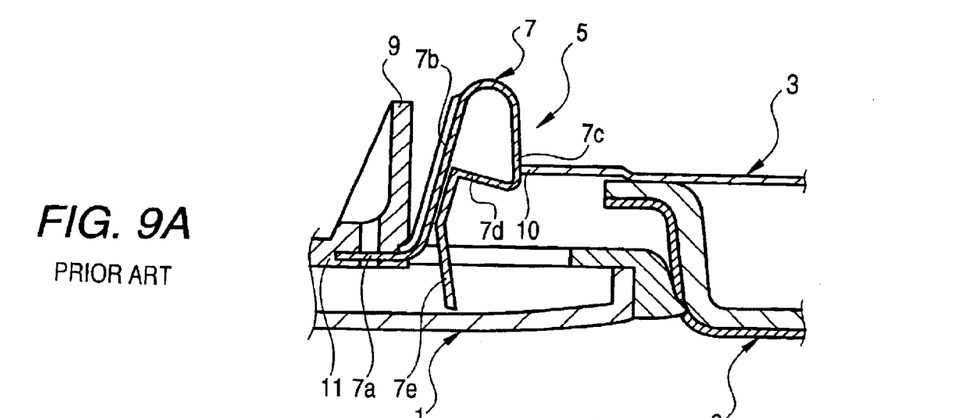
FIGS. 9A to 9C are enlarged sectional views of the essential part for explaining action of the retainer shown in FIG. 8.

However, there has been such an anxiety, in the related-art fixing structure of the room lamp as shown in FIGS. 7 and 8, that when the room lamp 1 and the roof trim 2 are plenarily fixed to the roof framework 3 by the plenary retainer 5, the hook portion 7d of the spring 7 may escape downwardly (toward an interior of the car) before the hook portion 7d of the spring 7 is set on the fixing part 10, as shown in FIG. 9A, and after an inner face (an upper face in the drawings) of the roof trim 2 has been abutted against a face of the roof framework 3 at the room side (a lower face in the drawings), the hook portion 7d may be unable to come into contact with the fixing part 10 of the roof framework 3, thus bringing the spring 7 in a half-fixed state.

Figure 9B:
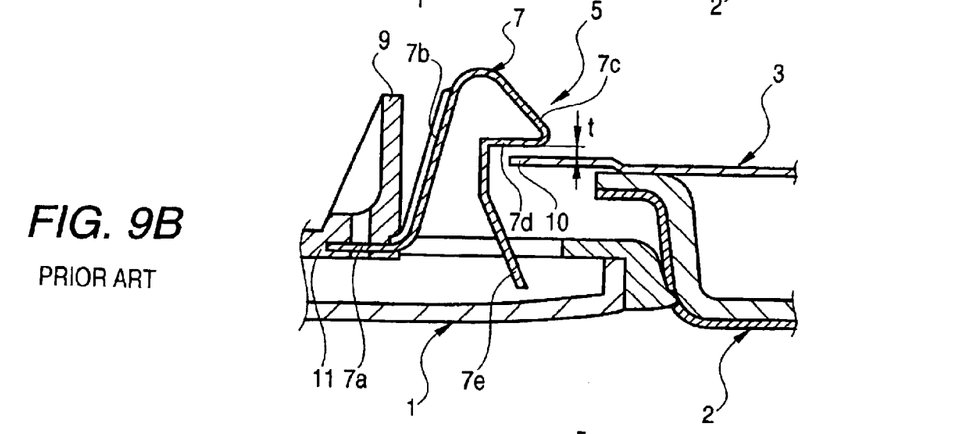

Under the circumstances, in order to prevent the spring 7 from being brought into the half-fixed state as described above, it has been necessary to provide a clearance t, as shown in FIG. 9B, between the fixing part 10 and the hook portion 7d, when the inner face of the roof trim 2 is in contact with the room side face of the roof framework 3. However, in case where such a clearance t becomes too large, it is concerned that the subassembly may rattle due to vibration or so of the car while driving, and may generate strange noises.

Figure 9C:
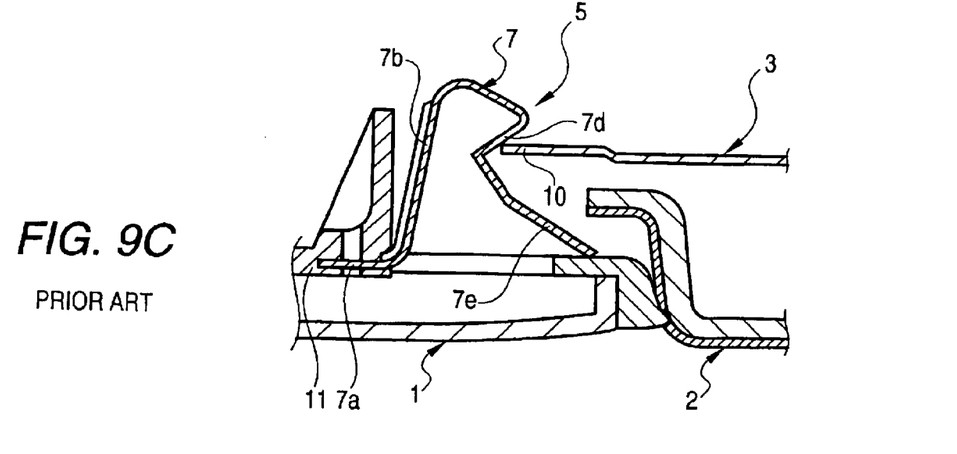

Moreover, as far as the spring 7 of the retainer 5 is concerned, when the roof subassembly composed of the room lamp 1 and the roof trim 2 receives a strong external force which is exerted on the roof framework 3 toward the room side (downward in the drawings), there is such an anxiety that the fixation may be disengaged as shown in FIG. 9C, because the hook portion 7d is likely to be directed upward so that the holding strength is reduced.

SUMMARY OF THE INVENTION

It is therefore an object of the present invention to provide a favorable lamp unit mounting structure which is capable of assembling both a lamp unit and an interior wall member simultaneously to a vehicle body panel easily and reliably.

In order to achieve the above object, according to the present invention, there is provided a lamp unit mounting structure, comprising:

a panel body of a vehicle;

an interior wall member, which covers an interior side of the panel body; and a lamp unit, including:

a first retainer, which engages with an exterior side of the interior wall member to retain the lamp unit on an interior side of the interior wall member;

a second retainer, which engages with an exterior side of the panel body to retain the interior wall member, on which the lamp unit is mounted, on the interior side of the panel body, the second retainer including a flexible arm having a free end portion which is flexible in a first direction parallel with the panel body and a second direction perpendicular to the panel body, the free end portion being abutted against the exterior side of the panel body when the interior wall member is mounted on the panel body; and a regulator, which prevents the free end portion of the flexible arm from being flexed more than a predetermined amount in the second direction when the flexible arm is not flexed in the first direction.

According to the structure, when a module composed of the lamp unit mounted to the interior wall member is assembled to the vehicle body panel, the flexible arm is flexed into such a state as the free end portion can be engaged with or disengaged from the mounting part of the vehicle body panel.

On this occasion, the regulators will restrict the free end portion from being displaced in the direction in which the lamp unit is mounted to or detached from the vehicle body.

Therefore, when the lamp unit and the interior wall member are simultaneously assembled to the vehicle body panel as the module, the free end portion of the flexible arm will not escape to the interior of the vehicle in the direction in which the lamp unit is mounted to or detached from the vehicle body, before the free end portion is engaged with the mounting part of the vehicle body panel.

Therefore, the second retainer will be prevented from being brought into a half-fixed state in which the free end portion of the flexible arm is unable to be engaged with the mounting part of the vehicle body panel, and can securely assemble the module to the vehicle body panel. Further, since the free end portion of the flexible arm will not escape to the interior of the vehicle in the direction in which the lamp unit is mounted to or detached from the vehicle body, there will be no need of providing an excessive clearance with respect to the mounting part of the vehicle body panel taking this escape into account.

Furthermore, when the module which has been fixed receives a strong external force exerted on the vehicle body panel in a direction to the interior of the vehicle, the flexible arm whose free end portion is restricted from being displaced in the direction in which the lamp unit is mounted to or detached from the vehicle body will not be disengaged from the fixed state, because the distal end portion will be prevented from being directed upward.

Preferably, the regulator includes a wall portion extending in the first direction, and the flexible arm includes a pair of projections arranged in the second direction such that the wall portion is fitted therebetween.

Here, it is preferable that the regulator includes a guide slope on which the projections of the flexible arm are slidable so that the free end portion of the flexible arm is allowed to be flexed more than the predetermined amount in the second direction when the flexible arm is flexed in the first direction.

In this case, when the module is assembled to the vehicle body panel, the free end portion will be flexed by the guide slope having the sliding guide face, into such a state as the free end portion can be engaged with or disengaged from the mounting part of the vehicle body panel, and at the same time displaced toward the vehicle body panel.

As the results, the free end portion of the flexible arm can be securely engaged with the mounting part of the vehicle body panel, even though there is no clearance provided with respect to the mounting part of the vehicle body panel when the assembly to the vehicle body has been completed. Further, since an elastic repulsive force can be created in the flexible arm when the assembly to the vehicle body has been completed, the module will be prevented from rattling with respect to the vehicle body panel.

Preferably, the lamp unit includes an elastic piece which is elastically abutted against the interior side of the panel body when the interior wall member is mounted on the panel body.

In this case, the module will be prevented from rattling with respect to the vehicle body panel.

DETAILED DESCRIPTION OF THE PREFERRED EMBODIMENTS

A lamp unit mounting structure according to one embodiment of the present invention will be described in detail referring to the accompanying drawings.

Figure 1:
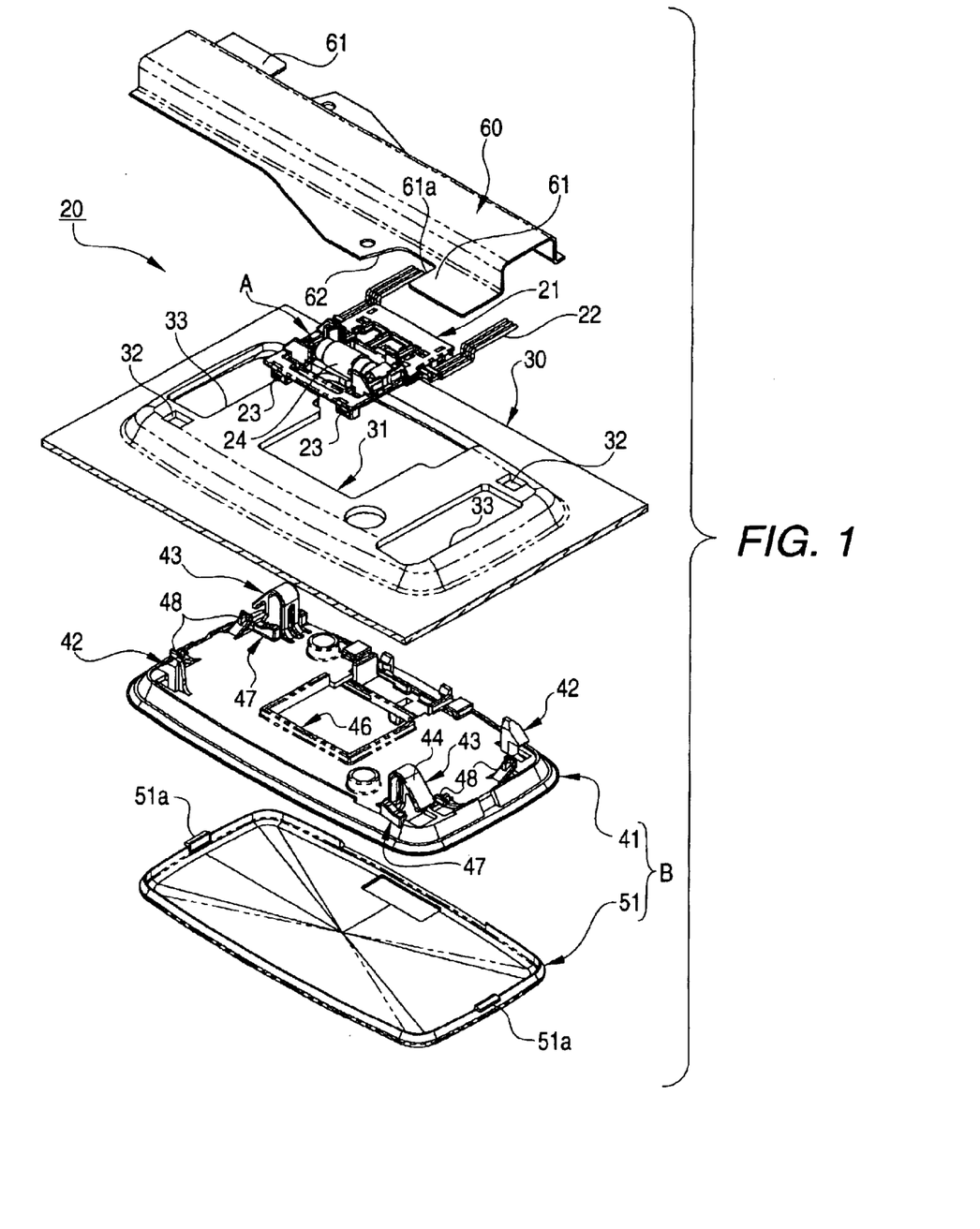
FIG. 1 is an exploded perspective view of a lamp unit mounting structure according to one embodiment of the present invention.

As shown in FIG. 1, a room lamp 20 is a lamp unit adapted to be fitted to a lamp mounting window 31 which is formed in a roof trim 30 as an interior wall member covering a roof of a vehicle body panel.

The room lamp 20 is composed of a mechanical section A including a bulb 24 mounted on a housing 21 and a switch part (not shown), and attached to the roof trim 30 at a roof body side (an upper side in the drawing), and an appearance section B including a cover lens 51 and a holder 41, and attached to the roof trim 30 at a room side (a lower side in the drawing).

To the bulb 24 provided in the housing 21 which constitutes the mechanical section A, is connected, via the switch part which is not shown, an FFC 22 which is a group of electric wires constituting a roof harness.

Specifically, a connecting part of the FFC 22 which is the roof harness to be arranged in advance on the roof trim 30 is electrically connected to a wire connecting part of the mechanical section A. A worker can conduct this connecting work while visually observing and confirming a state of the connection with his face down.

The cover lens 51 constituting the appearance section B is integrally mounted on the holder 41, by engaging locking projections 51a with engaging parts which are not shown of the holder 41.

The holder 41 is provided with engaging hooks 42 which are adapted to be engaged in engaging holes 32 formed in the roof trim 30 so as to fix the room lamp 20 and the roof trim 30 to each other, a housing insertion hole 46 into which the housing 21 is inserted, a retainer 43 for fixing the room lamp 20 and a reinforce 60 of the roof body to each other, and rattle preventive pieces 48 which are adapted to be elastically contacted with the reinforce 60 after the holder 41 has been mounted on the vehicle body.

The engaging hooks 42 and the retainer 43 are respectively provided in pairs on diagonal lines of the holder 41 which is in a rectangular shape as viewed from the above. The rattle preventive pieces 48 are integrally formed in pairs respectively along shorter edges of the holder 41 so as to extend diagonally upwardly.

Figure 2:
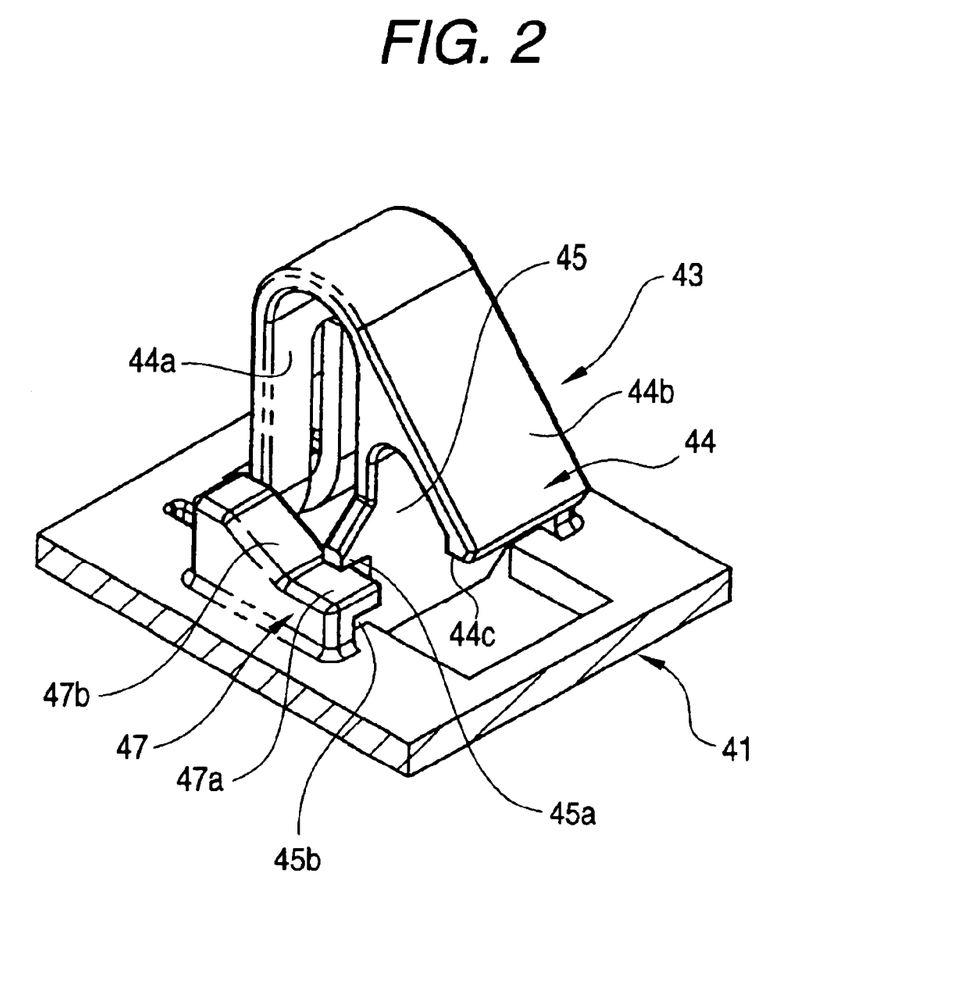
FIG. 2 is an enlarged perspective view of an essential part of a retainer shown in FIG. 1.

Each of the retainer 43 is provided in a hanging manner on the holder 41 of the room lamp 20 at a side opposed to the reinforce 60 (an upper face side in the drawings), as shown in FIG. 2, and includes a flexible arm 44 whose distal end portion 44c is adapted to be engaged with a mounting part 61 of the reinforce 60, and a pair of regulators 47 which are provided on both sides of the flexible arm 44. The mounting part 61 is composed of an edge of a cut-out 62 in the reinforce 60.

The flexible arm 44 includes a vertical portion 44a integrally formed on the holder 41, a flexible portion 44b folded diagonally downwardly from the vertical portion 44a in an inverted U-shape, and a support piece 45 which is suspended from a lower face of the flexible portion 44b. The distal end portion 44c of the flexible portion 44b is engaged with the mounting part 61 of the reinforce 60. Pairs of engaging projections 45a, 45b are respectively provided on opposite side edges of the support piece 45.

Each of the regulators 47 which are integrally formed on the holder 41 has a horizontal wall 47a which is engaged between a pair of the engaging projections 45a, 45b so as to restrict the distal end portion 44c from being displaced in a direction in which the room lamp 20 is mounted to or detached from the vehicle body (a vertical direction in the drawings).

The horizontal wall 47a includes a guide slope 47b adapted to be engaged with the engaging projection 45a, thereby allowing the distal end portion 44c of the flexible arm 44 which is flexed when mounted to or detached from the vehicle body to be displaced toward the reinforce 60.

In an event that the room lamp 20 in the present embodiment is mounted to the roof trim 30, the holder 41 is fitted to the lamp mounting window 31 formed in the roof trim 30 so as to cover the window, as a first step, and the engaging hooks 42 of the holder 41 are engaged in the engaging holes 32 in the roof trim 30, thereby allowing the holder 41 and the roof trim 30 to be fixed to each other. On this occasion, the retainer 43 and the rattle preventive pieces 48 will not interfere with the roof trim 30, owing to presence of the openings 33 formed in the roof trim 30 (See FIG. 3).

By fitting the cover lens 51 to the holder 41 from the vehicle room side (a lower side in FIG. 1) of the roof trim 30, the appearance section B is mounted to the roof trim 30 in advance.

Figure 3:
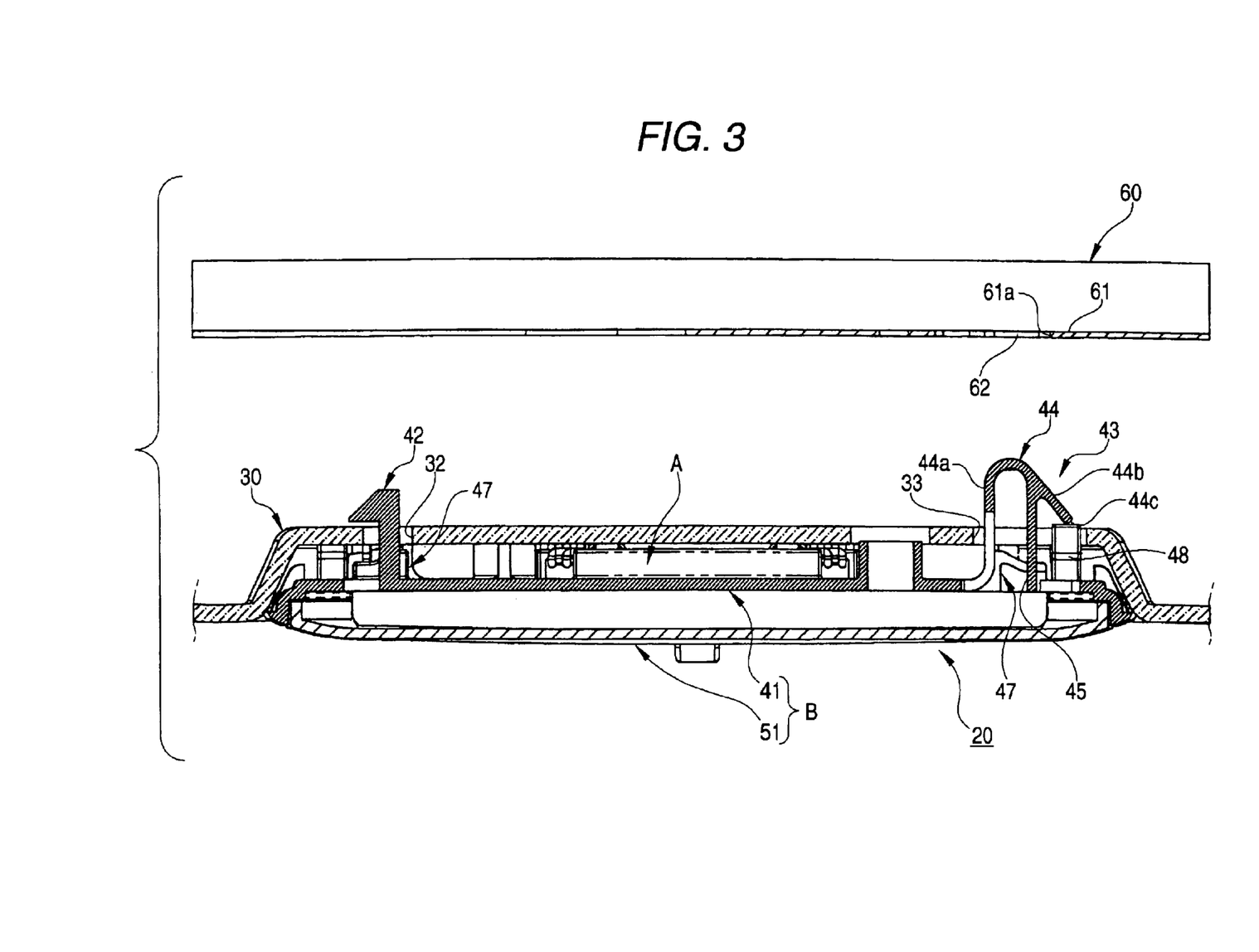
FIGS. 3 and 4 are longitudinal sectional views for explaining a process of mounting a lamp unit shown in FIG. 1 to a vehicle body panel.

Then, the housing 21 constituting the mechanical section A of the room lamp 20 which has been connected to the connecting part of the FFC 22 is inserted into the housing insertion hole 46 in the holder 41 from the side of the reinforce 60 (an upper side in the drawings), and trim mounting parts 23 are engaged with an open edge of the lamp mounting window 31, so that the mechanical section A can be directly mounted to the roof trim 30, as shown in FIG. 3.

On this occasion, the cover lens 51 may be mounted to the holder 41, after the housing 21 has been inserted into the housing insertion hole 46 in the holder 41.

After that, by arranging the FFC 22 to the roof trim 30 at the side of the reinforce 60, and at the same time, by mounting roof attachments such as a back mirror and sun visors which are not shown to the roof trim 30 beforehand, a roof module in which the room lamp 20 is integrated with the roof trim 30 together with these roof attachments is composed, as shown in FIG. 3.

Figure 4:
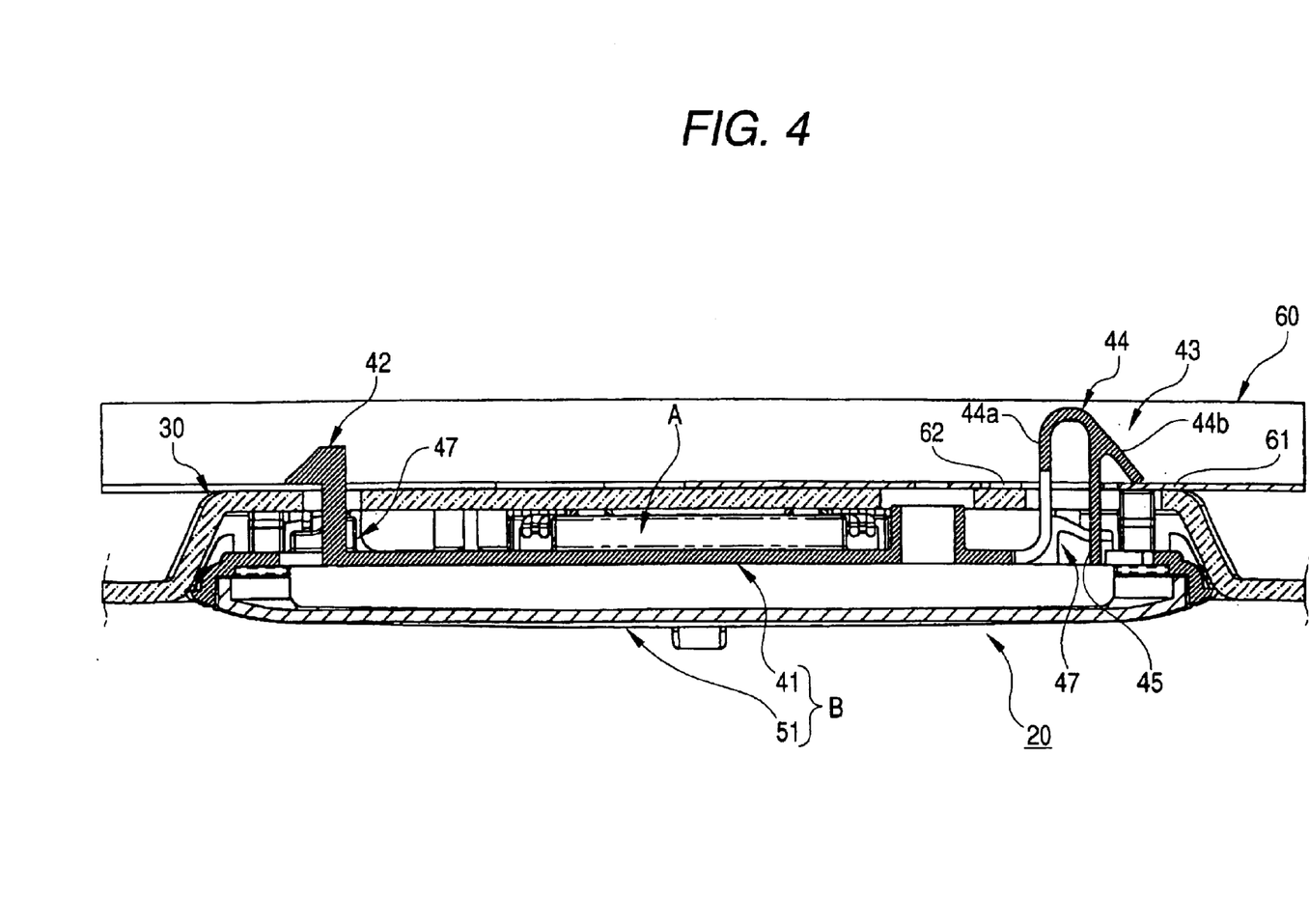
Figure 5:
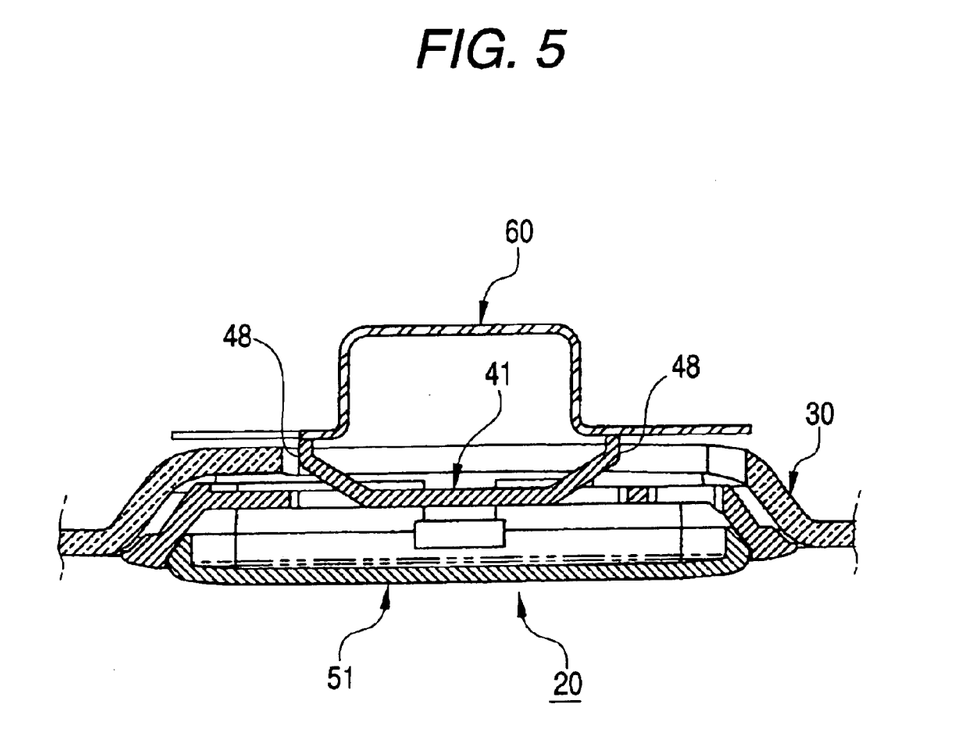
FIG. 5 is a cross sectional view for explaining the process of mounting the lamp unit shown in FIG. 1 to the vehicle body panel.

Then, as shown in FIGS. 4 and 5, the roof module in which the room lamp 20 and the roof trim 30 have been integrated is mounted to the roof body. On this occasion, the room lamp 20 and the roof trim 30 are fixed to the reinforce 60 by the retainer 43, by engaging the distal end portions 44c of the flexible arms 44 provided on the room lamp 20 with the mounting parts 61 of the reinforce 60.

In this manner, according to the mounting structure of the lamp unit in the present embodiment, the assembly work will be simplified, because the assembly work will be completed by simply mounting the roof module in which the room lamp 20 and the roof trim 30 have been integrated to the reinforce 60 of the roof body, and the mounting work of the roof attachments can be omitted when the roof trim is mounted.

Particularly, the retainer 43 in the present embodiment can easily and reliably assemble the room lamp 20 and the roof trim 30 at the same time to the reinforce 60 of the roof body owing to the flexible arm 44 and the regulators 47.

Figure 6A:
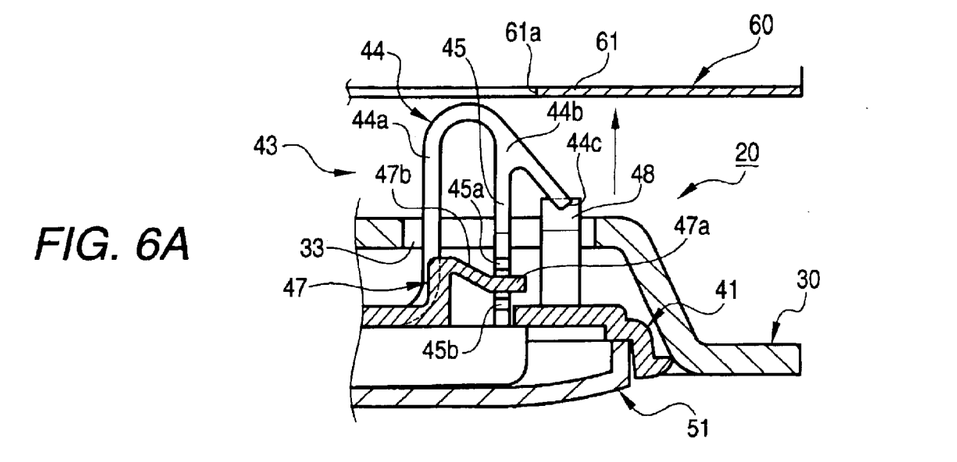
FIGS. 6A to 6C are enlarged sectional views of the essential part for explaining action of the retainer shown in FIG. 2.

More specifically, in the retainer 43 in the present embodiment, an edge of the horizontal wall 47a of each of the regulators 47 which are integrally formed on the holder 41 is engaged between a pair of the engaging projections 45a, 45b which are provided on opposite side edges of the support piece 45 of the flexible arm 44, as shown in FIG. 6A, thereby to restrict the distal end portion 44c from being displaced more than predetermined amount in the direction in which the room lamp 20 is mounted to or detached from the vehicle body (in a vertical direction in the drawings).

On occasion of mounting the roof module to the reinforce 60, when the flexible portion 44b of the flexible arm 44 has come into contact with the edge 61a of the mounting part 61, the distal end portion 44c rides over the edge 61a and the flexible portion 44b is flexed, until the flexible arm 44 can be engaged or disengaged with respect to the mounting part 61.

At this instance, because the engaging projection 45a provided on the support piece 45 of the flexible arm 44 comes into contact with an upper face of the horizontal wall 47a of the regulator 47, the flexible portion 44b can be displaced only in a direction in which the distal end portion 44c is brought near the vertical portion 44a, but can be hardly displaced downwardly in the direction in which the room lamp 20 is mounted to or detached from the vehicle body (in a vertical direction in the drawings).

Accordingly, when the room lamp 20 and the roof trim 30 are simultaneously mounted to the reinforce 60 as the module, the distal end portion 44c will not escape toward the vehicle room side (downwardly) in the direction in which the room lamp 20 is mounted to or detached from the vehicle body, before the distal end portion 44c of the flexible arm 44 is engaged with the mounting part 61 of the reinforce 60.

As the results, the distal end portion 44c of the flexible arm 44 will be prevented from coming into a half-fixed state without being engaged with the mounting part 61 of the reinforce 60, and the retainer 43 will be able to securely assemble the module to the reinforce 60.

Further, since the distal end portion 44c of the flexible arm 44 will not escape toward the vehicle room side in the direction in which the room lamp 20 is mounted to or detached from the vehicle body, when mounted to the vehicle body as described above, there is no need of providing an excessive clearance with respect to the mounting part 61 of the reinforce 60 taking this escape into account.

Figure 6B:
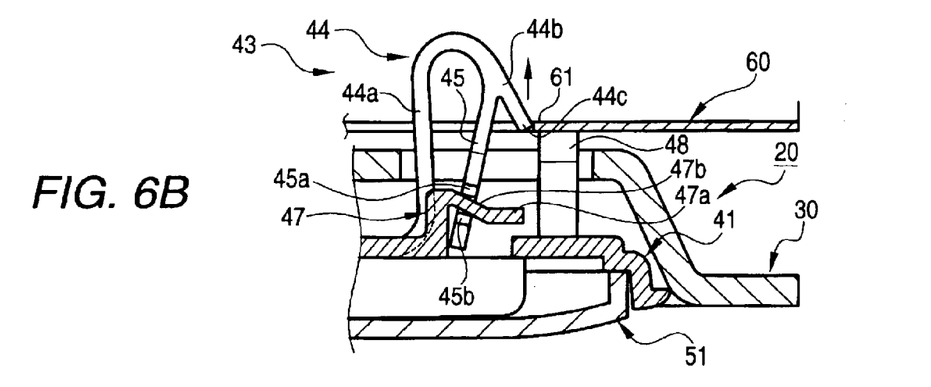

Furthermore, the horizontal wall 47a of the regulator 47 in the present embodiment is provided with the guide slope 47b having the sliding guide face which is adapted to be engaged with the engaging projections 45a and 45b, as shown in FIG. 6B, to displace the distal end portion 44c of the flexible arm 44 which is flexed while mounted to or detached from the vehicle body toward the reinforce 60.

When the module is assembled to the reinforce 60 of the roof body, the flexible portion 44b is flexed in such a direction that the distal end portion 44c may be brought near the vertical portion 44a and displaced into a detachable state with respect to the mounting part 61. At the same time, the flexible portion 44b is displaced also toward the reinforce 60 (upwardly), so that the distal end portion 44c can be displaced upwardly more than in an ordinary state and can reliably ride over an edge 61a of the mounting part 61.

Accordingly, the distal end portion 44c of the flexible arm 44 can be securely engaged with the mounting part 61, even though such a clearance as the clearance t in the related-art fixing structure of the room lamp as shown in FIG. 9B is not provided with respect to the mounting part 61, when the assembly to the vehicle body has been completed.

Figure 6C:
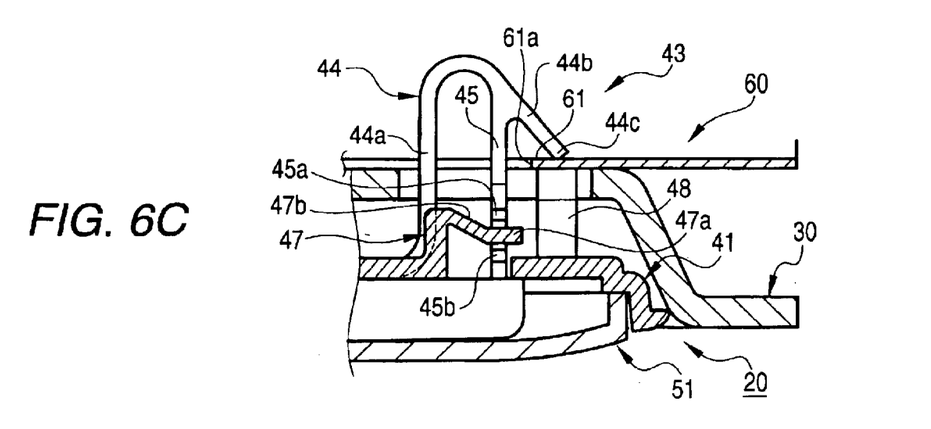

Further, as shown in FIG. 6C, when the distal end portion 44c has ridden over the edge 61a, an upward force of the guide slope 47b exerted on the flexible portion 44b is removed, and the distal end portion 44c will be restored to the ordinary state. Then, an elastic repulsive force can be created in the flexible arm 44 when the assembly to the vehicle body has been completed, and the flexible portion 44b is elastically abutted against the mounting part 61, thus preventing the module from rattling with respect to the reinforce 60.

In addition, there are provided rattle preventive pieces 48 in the holder 41 of the room lamp 20 in the present embodiment. The rattle preventive pieces 48 are elastically abutted against the reinforce 60 after the room lamp has been assembled to the vehicle body, as shown in FIGS. 5 and 6C. As the results, in case where a gap has been created between the distal end portion 44c and the mounting part 61 due to molding errors or assembling tolerances for example, rattling of the module with respect to the reinforce 60 can be reliably prevented by the rattle preventive pieces 48.

Consequently, the module will not rattle due to vibration of the car while driving, and occurrence of strange noises will not be incurred.

Moreover, as shown in FIGS. 4 and 6C, when the module fixed to the reinforce 60 of the roof body has received a strong external force exerted on the reinforce 60 toward the interior of the room (downwardly in the drawings), the engaging projection 45b projected from the support piece 45 of the flexible arm 44 is abutted against a lower face of the horizontal wall 47a of the regulator 47, and the distal end portion 44c of the flexible portion 44b can hardly be displaced upwardly in the direction in which the room lamp 20 is mounted to or detached from the vehicle body (in a vertical direction in the drawings).

In this manner, the distal end portion 44c of the flexible arm 44 will be prevented from being directed upward, the holding strength will be enhanced, and accordingly, the distal end portion 44c will not be disengaged from the fixed state.

It is needless to say that the constitution of the vehicle body panel, the interior wall member, the lamp unit, the wire connecting part and the electric wires, etc. in the mounting structure of the lamp unit according to the present invention is not restricted to the above embodiment, but various modifications can be employed based on concept of the present invention.

For example, although in the embodiment, the description has been made in case that the room lamp which is the room unit is mounted to the roof trim which is the interior wall member, the present invention can be applied to such cases as a map lamp to be mounted to the roof trim, a lamp unit such as a courtesy lamp to be mounted to a door trim as the interior wall member covering the vehicle body panel such as a door panel, etc.

As the electric wires to be arranged in the interior wall member, not only the FFC in the embodiment, but also an FPC (a flexible printed wiring board) and a flat circuit such as ribbon type electric wires, a wire harness, and so on can be employed.

What is claimed is:

1. A lamp unit mounting structure, comprising:
    a panel body of a vehicle;
    an interior wall member, which covers an interior side of the panel body; and
    a lamp unit, including:
        a retainer, which engages with an exterior side of the panel body through the interior wall member, to retain the lamp unit on an interior side of the interior wall member, the retainer including a flexible arm having a free end portion which is flexible in a first direction parallel with the panel body and a second direction perpendicular to the panel body, the free end portion being abutted against the exterior side of the panel body when the interior wall member is mounted on the panel body; and
        a regulator, which prevents the free end portion of the flexible arm from being flexed more than a predetermined amount in the second direction when the flexible arm is not flexed in the first direction,
    wherein the regulator includes a wall portion extending in the first direction, and the flexible arm includes a pair of projections arranged in the second direction such that the wall portion is fitted therebetween.

2. The lamp unit mounting structure as set forth in claim 1, wherein the regulator includes a guide slope on which the projections of the flexible arm are slidable so that the free end portion of the flexible arm is allowed to be flexed more than the predetermined amount in the second direction when the flexible arm is flexed in the first direction.

3. The lamp unit mounting structure as set forth in claim 1, wherein the lamp unit includes an elastic piece which is elastically abutted against the interior side of the panel body when the interior wall member is mounted on the panel body.

* * * * *